J. R. COX.
RESILIENT NECK BEARING.
APPLICATION FILED NOV. 12, 1912.
1,135,502.
Patented Apr. 13, 1915.
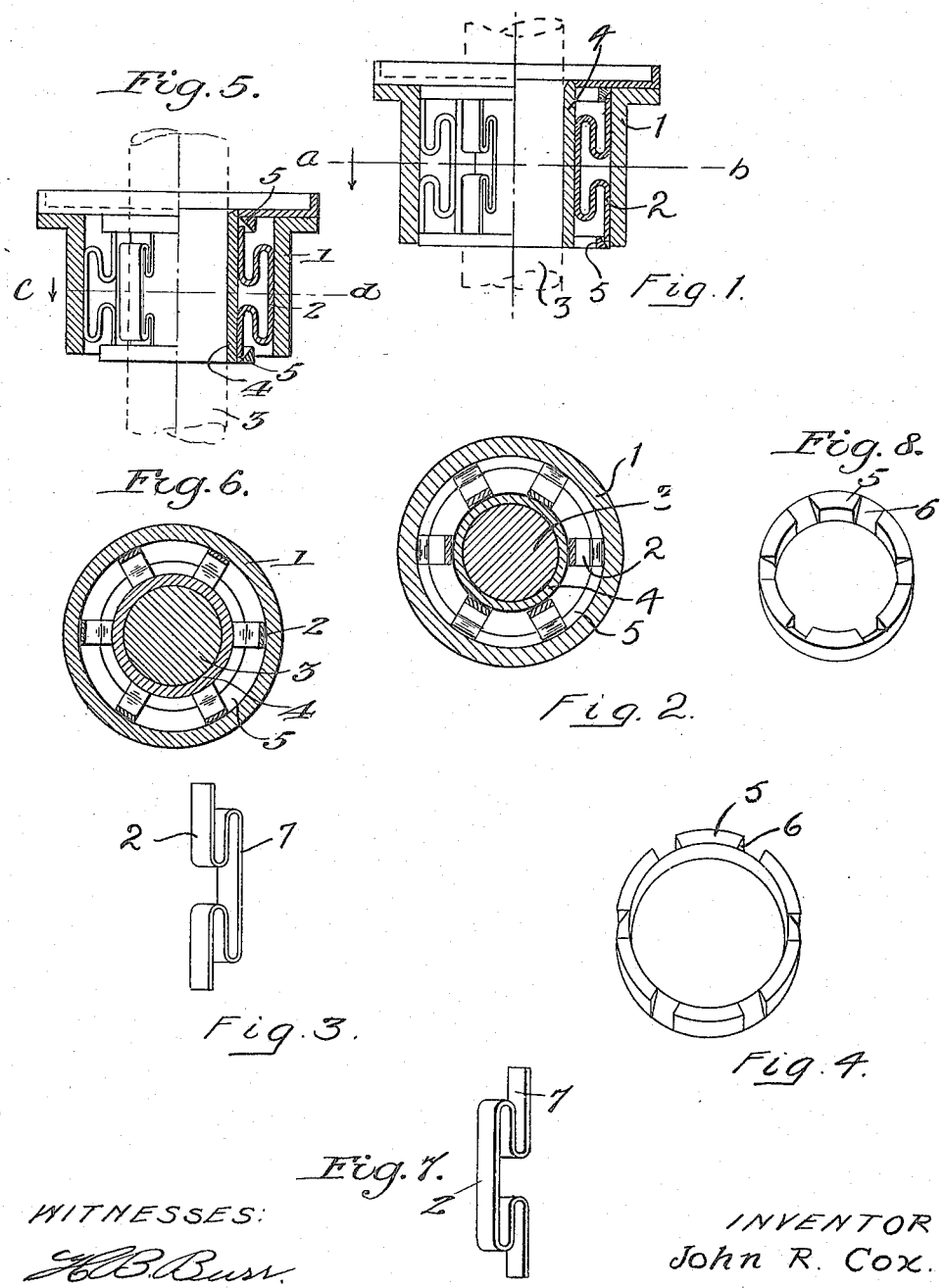
INVENTOR
John R. Cox.

UNITED STATES PATENT OFFICE.

JOHN R. COX, OF WATERLOO, IOWA, ASSIGNOR TO THE WILLIAM GALLOWAY COMPANY, OF WATERLOO, IOWA.

RESILIENT NECK-BEARING.

1,135,502.　　　　　Specification of Letters Patent.　　Patented Apr. 13, 1915.

Application filed November 12, 1912. Serial No. 730,959.

*To all whom it may concern:*

Be it known that I, JOHN R. COX, a citizen of the United States of America, and a resident of Waterloo, Blackhawk county, Iowa, have invented certain new and useful Improvements in Resilient Neck-Bearings, of which the following is a specification.

My invention relates to improvements in resilient neck bearings, and the object of my improvement is to furnish for the neck bearing of the bowl-spindle of a centrifugal cream separator or the like, interposed yieldable resilient means adapted to act upon the bearing of such spindle to effectually return it to its proper axial line when momentarily deflected therefrom and when under the influence of centrifugal force. This object I have accomplished by the means which are hereinafter described and claimed, and which are illustrated in the accompanying drawings, in which:

Figure 1 is a vertical central axial section of a spindle-bearing, its casing, and spring retaining-rings, with a plurality of my improved springs interposed therein, the medial projections of the springs shown as bearing against the spindle-bearing. Fig. 2 is a horizontal section of the parts shown in Fig. 1, taken on the line *a—b* thereof. Fig. 3 is a perspective view of one of my improved springs for said bearing. Fig. 4 is a perspective view of one of the spring retaining-rings. Fig. 5 is a vertical central axial section of a spindle-bearing, its casing, and spring retaining-rings, with a plurality of my improved springs interposed therein, the medial projections of the springs shown as bearing against the inner casing wall. Fig. 6 is a horizontal section of the parts shown in Fig. 5, taken on the line *c—d* thereof. Fig. 7 is a perspective view of one of the improved springs for said bearing, taken oppositely to that shown in Fig. 3. Fig. 8 is a perspective view of one of the spring retaining-rings modified to be seated against the inner casing wall.

Referring particularly to Figs. 5 to 8 inclusive, which illustrate the preferred mounting of the parts of my resilient neck bearing, 1 is a casing-sleeve, with cylindrical vertical opening and 4 is the spindle bearing of hollow cylindrical form and of less diameter than said casing-sleeve, held dependent therein by its upper outwardly projected annular rim, the latter brazed thereto. The dotted lines in Figs. 1 and 5 denote the position of a spindle in said bearing, and the construction of casing-sleeve and spindle-bearing shown in Fig. 5 is the same as that shown in Fig. 1.

In Fig. 5, spring-retaining rings 5 are brazed or otherwise secured on the outer wall of the bearing 4 at top and bottom of its dependent cylindrical part, said rings being reversed so as to present their spring-seats toward each other. Each ring has the same plurality of sloped spring-seats 6, inclined downward and inward relative to the bearing 4 for the lowermost ring, and inclined inward and upward for the upper ring. In Fig. 1, the spring-retaining rings are of greater diameter so as to be secured against the inner wall of the casing-sleeve at the top and bottom thereof, and have similar spring-seats 6 which are inclined from within outwardly. In both cases the spring is the same, shown in Figs. 3 and 7, being a flat resilient strip medially bent in opposite directions to form a middle part 2 projected to one side of the ends 7 and connected thereto by substantially S-shaped connecting parts, so that the part 2 lies in a plane parallel with a plane in which the ends 7 are located. In Fig. 5, the springs are arranged equidistantly about the bearing 4, with their ends detachably sprung into the seats 6 of the retaining-rings 5. In Fig. 1, the springs are reversed in position from those shown in Fig. 5, in that those shown in said Fig. 5 have their medial projections 2 in contact with the inner wall of the casing-sleeve, the springs in Fig. 1, having said projections in contact with the bearing 4. However, the action is the same essentially in both cases, except that in Fig. 5, the spring-ends 7 have a contact with the bearing 4 extending to the upper and lower ends thereof.

To assemble the bearing, the spring is pushed together enough to permit of slipping its ends 7 into the oppositely placed spring-seats, and it may be removed in a similar way. The springs are very light, and elastic, and may be arranged about the bearing in any desired plurality.

Having described my invention, what I claim as new, and desire to secure by letters patent, is:

A resilient neck bearing, comprising a neck-bearing body, a concentric inclosing casing-body, a plurality of parallel vertical spaced resilient bars located about the neck-bearing body and between said bearing and the concentric inclosing casing-body and each formed and adapted to bear against both said bearing and casing yieldably, each bar having its end portions in the same plane vertically, the bar being bent near each extremity into an outwardly-directed loop and again bent into a reversely-directed loop, the medial part of the bar between the reversely-directed loops lying in a plane parallel to that of the ends of the bar, and providing flat contacting-means adapted to bear yieldingly upon the one of said bodies opposite the other body upon which the ends of the bar are in contact.

Signed at Waterloo, Iowa, this 25th day of Oct., 1912.

JOHN R. COX.

Witnesses:
W. H. BRUNN,
GEO. C. KENNEDY.

Copies of this patent may be obtained for five cents each, by addressing the "Commissioner of Patents, Washington, D. C."